US011331735B2

(12) United States Patent
Walker et al.

(10) Patent No.: US 11,331,735 B2
(45) Date of Patent: May 17, 2022

(54) MULTI-TOOL CHAMFERING DEVICE FOR TOOTHED WORKPIECES

(71) Applicant: THE GLEASON WORKS, Rochester, NY (US)

(72) Inventors: Michael J. Walker, Fairport, NY (US); Benjamin A. Hollander, Lancaster, NY (US); Peter E. Chapin, Fairport, NY (US); Eric G. Mundt, Rochester, NY (US)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 17/054,547

(22) PCT Filed: May 20, 2019

(86) PCT No.: PCT/US2019/033030
§ 371 (c)(1),
(2) Date: Nov. 11, 2020

(87) PCT Pub. No.: WO2019/226503
PCT Pub. Date: Nov. 28, 2019

(65) Prior Publication Data
US 2021/0245278 A1 Aug. 12, 2021

Related U.S. Application Data

(60) Provisional application No. 62/676,474, filed on May 25, 2018.

(51) Int. Cl.
*B23F 19/10* (2006.01)
*B23Q 1/54* (2006.01)
(Continued)

(52) U.S. Cl.
CPC .............. *B23F 19/105* (2013.01); *B23C 1/12* (2013.01); *B23F 17/006* (2013.01);
(Continued)

(58) Field of Classification Search
CPC . Y10T 409/101113; Y10T 409/101272; Y10T 409/307168; Y10T 409/307784;
(Continued)

(56) References Cited

U.S. PATENT DOCUMENTS 3,285,134 A * 11/1966 Kehr ....................... B23F 23/12
409/52
3,782,041 A * 1/1974 Batorski ................. B23F 19/12
451/123

(Continued)

FOREIGN PATENT DOCUMENTS

CN 113305369 A * 8/2021
DE 3000295 A * 7/1981
(Continued)

OTHER PUBLICATIONS

International Search Report and Written Opinion for PCT/US2019/033030, ISA/EPO, dated Sep. 4, 2019, 13 pgs.

*Primary Examiner* — Erica E Cadugan
(74) *Attorney, Agent, or Firm* — Robert L. McDowell (57) ABSTRACT

A toothed workpiece chamfering device having a chamfering head (2) which includes a first axis of rotation (B) for rotation of a first chamfering tool (6) and a second axis of rotation (T) for rotation of a second chamfering tool (8) wherein the first and second chamfering tools are of different types and their respective material removal methods are also different from one another. Preferably, the first and second axes of rotation are not coincident with one another and in a more preferred arrangement, the first tool axis and the second tool axis are arranged perpendicularly to one another.

14 Claims, 12 Drawing Sheets

(51) Int. Cl.
  *B23Q 39/02*   (2006.01)
  *B23C 1/12*    (2006.01)
  *B23F 17/00*   (2006.01)
  *B23F 23/12*       (2006.01)
  *B23F 5/22*        (2006.01)
  *B23F 5/24*        (2006.01)

(52) U.S. Cl.
  CPC .......... *B23F 19/107* (2013.01); *B23Q 1/5406* (2013.01); *B23Q 39/027* (2013.01); *B23F 5/22* (2013.01); *B23F 5/24* (2013.01); *B23F 23/1218* (2013.01); *Y10T 409/101113* (2015.01); *Y10T 409/108586* (2015.01); *Y10T 409/308512* (2015.01)

(58) Field of Classification Search
  CPC . Y10T 409/308344; Y10T 409/308568; Y10T 409/307672; Y10T 409/308232; Y10T 409/308512; B23F 19/10; B23F 19/102; B23F 19/105; B23F 19/107; B23F 17/006; B23C 1/04–1/045; B23C 1/08; B23C 1/10; B23C 1/12; B23Q 1/50–1/5493
  USPC ....... 409/8–9, 192, 203, 213, 217, 201, 211, 409/216
  See application file for complete search history.

(56) References Cited

U.S. PATENT DOCUMENTS

| | | | | |
|---|---|---|---|---|
| 3,818,795 A * | 6/1974 | Upham | ................. | B23F 19/105 409/9 |
| 4,092,082 A * | 5/1978 | Severson | ............. | B23C 5/2252 407/40 |
| 4,687,383 A * | 8/1987 | Shimomura | .......... | B23C 5/2278 407/46 |
| 4,726,720 A | 2/1988 | Wera | | |
| 5,490,307 A * | 2/1996 | Link | ...................... | B23B 3/168 29/27 C |
| 5,971,680 A * | 10/1999 | Kuo | .......................... | B23C 3/12 409/138 |
| 6,217,262 B1 * | 4/2001 | Wright | ..................... | B23C 3/12 407/40 |
| 6,676,337 B2 | 1/2004 | Daniek | | |
| 7,103,973 B2 | 9/2006 | Wolff et al. | | |
| 7,461,441 B2 * | 12/2008 | Langerfeld | ............. | B23F 5/205 29/56.5 |
| 7,574,798 B2 * | 8/2009 | Langerfeld | .......... | B23F 17/006 29/893.35 |
| 8,690,494 B2 * | 4/2014 | Fang | ....................... | B23C 5/109 407/61 |
| 8,769,820 B2 | 7/2014 | Philippin et al. | | |
| 2014/0255118 A1 * | 9/2014 | Zeller | ...................... | B23C 1/04 409/40 |
| 2014/0294530 A1 | 10/2014 | Geiser et al. | | |
| 2017/0173713 A1 | 6/2017 | Felsomat | | |

FOREIGN PATENT DOCUMENTS

| | | | |
|---|---|---|---|
| DE | 3310000 A1 * | 9/1984 | |
| DE | 19518483 A1 * | 11/1996 | |
| DE | 19701267 A1 | 7/1998 | |
| DE | 202013009805 U1 | 2/2014 | |
| EP | 3107826 A2 | 5/1984 | |
| GB | 909180 A | 10/1962 | |
| GB | 1470028 A * | 4/1977 | |
| GB | 1521152 A * | 8/1978 | |
| GB | 1582827 A * | 1/1981 | |
| JP | 2006-224228 A * | 8/2006 | |

* cited by examiner

MULTI-TOOL CHAMFERING DEVICE FOR TOOTHED WORKPIECES

FIELD OF THE INVENTION

The present invention is directed to chamfering of toothed workpieces such as gears, splines and shafts. In particular, the invention comprises a multi-axis and multi-tool chamfering device for toothed workpieces.

BACKGROUND OF THE INVENTION

In the manufacture of toothed workpieces such as gears (for example spur gears, helical gears and bevel gears; shafts with toothed portions and/or elements; and splines), it is common for a sharp corner or edge to be formed at the intersection of a tooth flank or tooth slot with an end face of the workpiece. In most cases, it is desirable to remove the corner or edge portion of a tooth via a process known as chamfering.

Chamfering a tooth edge can be carried out with a variety of tools including, but not limited to, fly cutter, milling tool including a pencil mill, hob, profile cutter, grinding wheel, peripheral cutter, ChamferCut-type tool as disclosed in U.S. Pat. No. 7,103,973, skiving cutter, rolling deburring wheel as disclosed in U.S. Pat. No. 6,676,337, etc. As is apparent to the skilled artisan, the particular tool is dependent upon, among other things, workpiece geometry, manufacturing process parameters, machine constraints, productivity requirements and personal preferences.

It is known from U.S. Pat. No. 8,769,820 to provide a device movable along one or more axes wherein a chamfering tool may be swiveled 180 degrees so that the cutting direction of the chamfering tool can be reversed at opposite ends of a tooth slot. While the direction of rotation of the drive of the tool remains the same in both swivel positions, the cutting directions of the tool are opposite to each other so that the tooth can be cut from inside to outside on the two end faces of the workpiece in both machining positions.

US 2014/0294530 teaches a chamfering device capable of linear motion along three perpendicular linear axes and well as swiveling about a pivot axis. The device includes two chamfering cutters located on the same tool spindle for chamfering a workpiece on two different sides.

US 2017/0173713 discloses a multi-axis positionable chamfering device comprising a pair of skiving tools with the tool axes being inclined toward one another and with each axis being angularly adjustable through two different angles.

For certain workpieces, however, a single type of chamfering tool may not be sufficient. Some workpieces (e.g. shafts) may have a plurality of gears located thereon with the gears having different sizes and/or tooth geometries. The edge of the root portion of certain gears may be difficult to chamfer with the same tool as is used for the edge of a tooth profile. A chamfering tool suitable for chamfering one gear may not be suitable for chamfering another gear on the same shaft.

There remains a need for a chamfering device having greater flexibility so as to enhance chamfering capabilities given the large variety of workpiece types, sizes and geometries.

SUMMARY OF THE INVENTION

The invention comprises a toothed workpiece chamfering device having a chamfering head which includes a first axis of rotation for rotation of a first chamfering tool and a second axis of rotation for rotation of a second chamfering tool wherein the first and second chamfering tools are of different types. The chamfering head is operable to rotate a first chamfering tool about the first axis of rotation thereby enabling chamfering by a first material removal method. The chamfering head is further operable to rotate a second chamfering tool about the second axis of rotation thereby enabling chamfering by a second material removal method wherein the first material removal method and the second material removal method are different from one another. Preferably, the first and second axes of rotation are not coincident with one another and in a more preferred arrangement, the first tool axis and the second tool axis are arranged perpendicularly with respect to one another.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and/or any internal or external guarding have been omitted from the drawings.

The use of "including", "having" and "comprising" and variations thereof herein is meant to encompass the items listed thereafter and equivalents thereof as well as additional items. The words "a" and "an" are understood to mean "one or more" unless a clear intent to limit to only one is specifically recited. Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

The present invention comprises a toothed workpiece chamfering device having a chamfering head which includes a first tool axis of rotation and a second tool axis of rotation. The chamfering head is operable to rotate a first chamfering tool about the first axis of rotation thereby enabling chamfering of a toothed workpiece by a first material removal method. The chamfering head is further operable to rotate a second chamfering tool about the second axis of rotation thereby enabling chamfering of a toothed workpiece by a second material removal method. The first chamfering tool and the second chamfering tool are different from one another and the first material removal method and the second material removal method are also different from one another.

Figure 1:
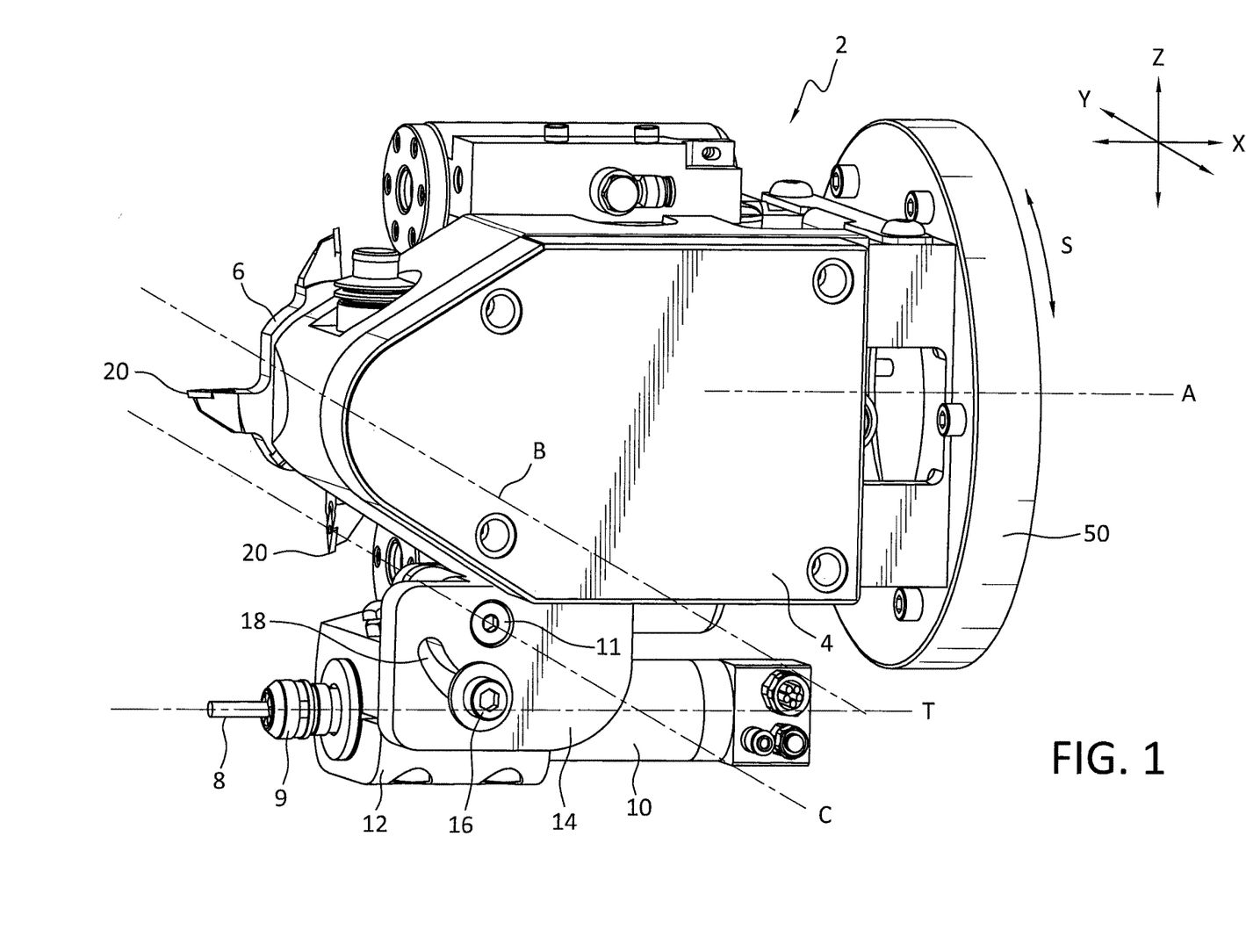
FIG. 1 is a perspective view of a side of a chamfering head.
Figure 2:
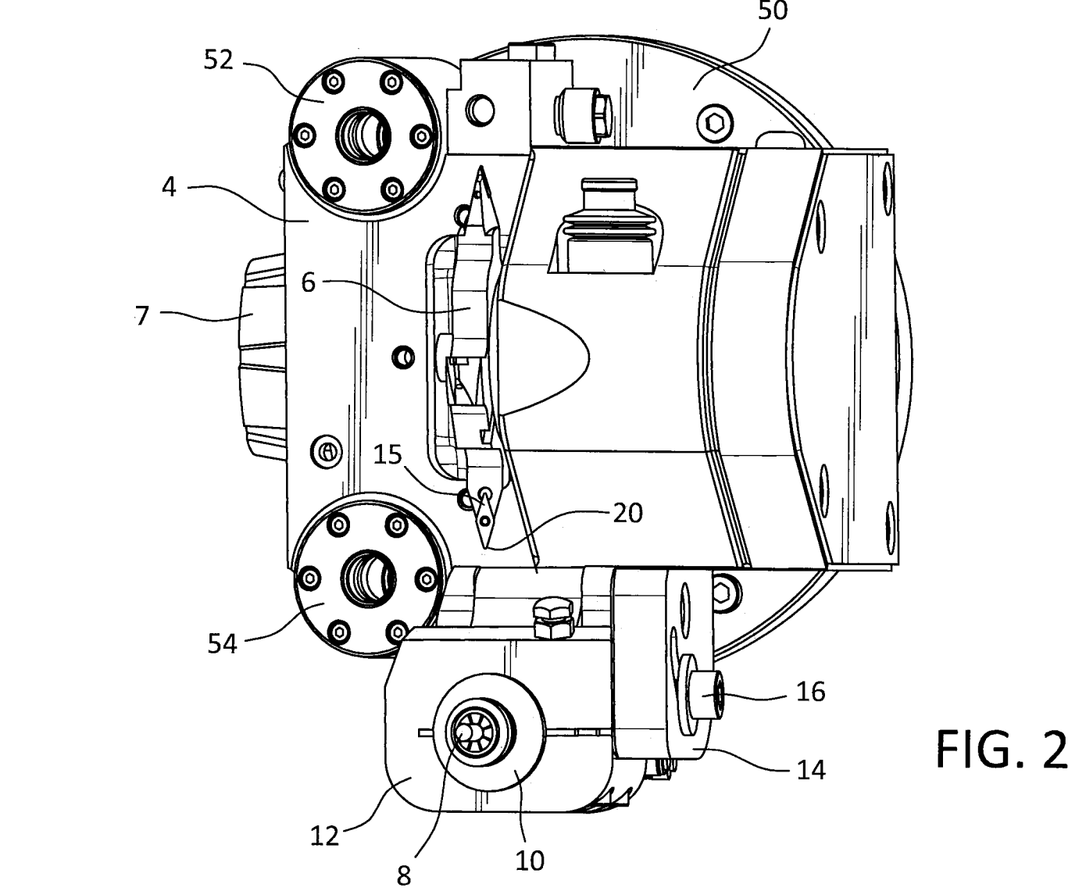
FIG. 2 is a perspective view of the front of the chamfering head of FIG. 1.
Figure 3:
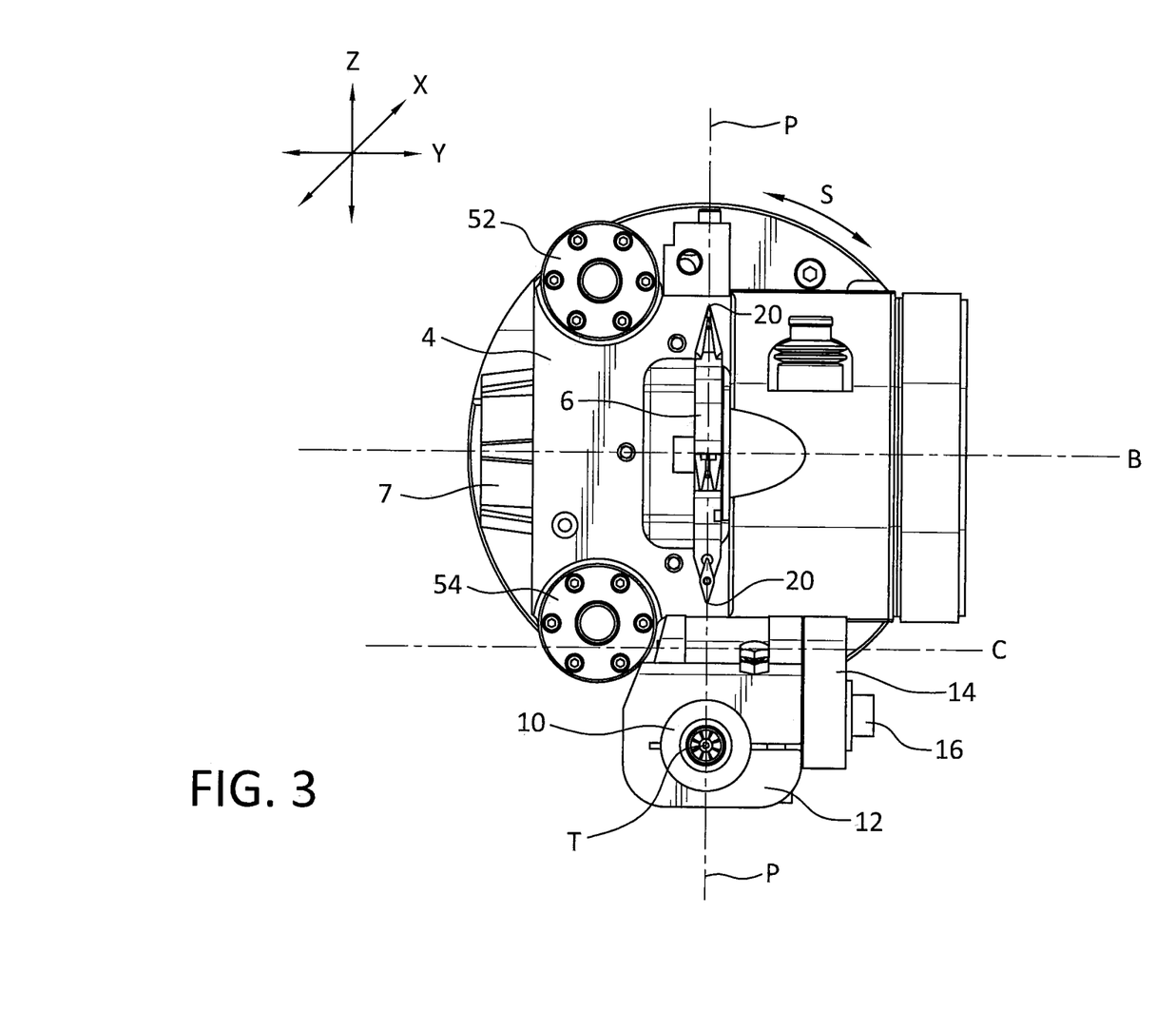
FIG. 3 shows a front elevation view of the chamfering head of FIG. 1.
Figure 9:
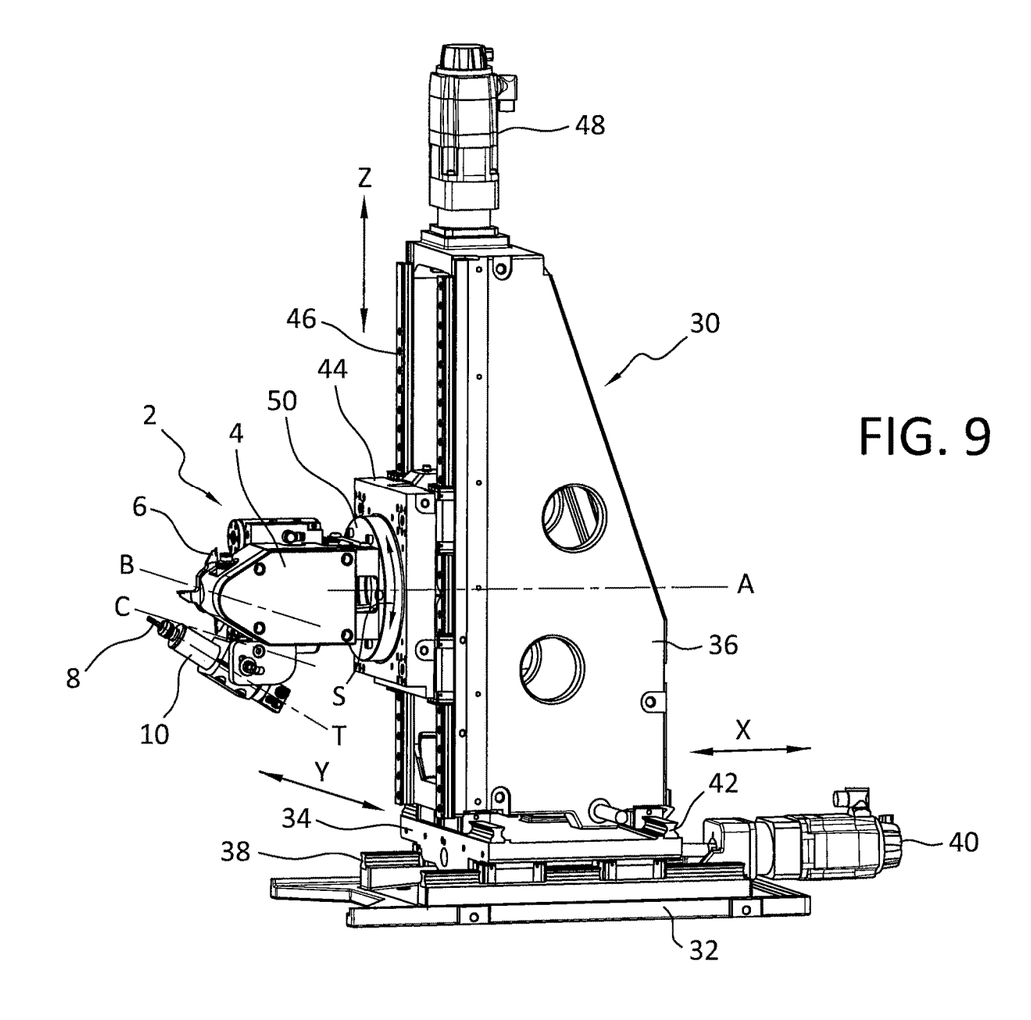
FIG. 9 is a perspective view of a chamfering device including a chamfer head according to the invention.

FIGS. 1-3 show the inventive chamfering head 2 which is part of a chamfering device such as illustrated by FIG. 9. The chamfering head 2 includes a body portion 4 capable of supporting at least two tools for rotation, preferably tools that are different from one another such as different types of tools that enable different material removal methods. A first tool 6, preferably a cutting tool such as a fly cutter with one or more indexable inserts 15, is releasably attached to body 4, via suitable tool-holding equipment (not shown), for rotation about a first tool axis B via a motor 7 such as a servo motor.

A second tool 8, preferably a cutting tool such as a milling tool, for example a pencil mill, is releasably attached to a motor 10, via suitable tool holding equipment such as a chuck 9, for rotation about a second tool axis T wherein motor 10 is preferably an electrical motor, for example, a brushless motor. Motor 10 is preferably attached to body portion 4 via a motor clamp 12 and a bracket 14. In operation, one or both of the chamfering tools 6, 8 may be utilized for chamfering a particular workpiece. Tools 6 and 8 are rotatable in either direction about their respective axis of rotation.

Tool 8 is preferably capable of pivoting about an axis C. Therefore, it can be seen that regardless of the angular orientation of tool 8 about axis C, tool axis T will remain in a plane P (FIG. 3). As can be viewed in FIG. 1, a desired pivot angle of tool 8 may be set by angularly moving the motor 10 about axis C. To do so, screw 16, which extends through an arcuate channel 18 in bracket 14 and into engagement with motor clamp 12, is loosened such that the screw may move along channel 18 during pivoting of motor 10 about a pin 11 until the desired pivot angle is reached (see FIG. 4, angle α, for example) at which time screw 16 is tightened so as to set the angular position of the tool 8. Optionally, a spherical head locating screw may be mounted to motor clamp 12 so as to enable fine adjustments to be made to the final pivot angle and provide a repeatable hard stop for that manual actuation. While the pivoting of motor 10 may be carried out manually, the pivoting and setting of tool 8 may, alternatively, be motorized and/or computer controlled.

Preferably, first tool axis B and second tool axis T are not coincident with one another and, more preferably, are perpendicular to one another. Thus, preferably, plane P is perpendicular to tool axis B. Furthermore, it is preferred that the cutting circle defined by the tips 20 of the fly cutter 6 also lie in plane P as is shown in FIG. 3.

Body portion 4 may further include cylinders 52, 54, such as hydraulic or pneumatic actuated cylinders, which will be further discussed below with reference to FIGS. 10-12.

Figure 4:
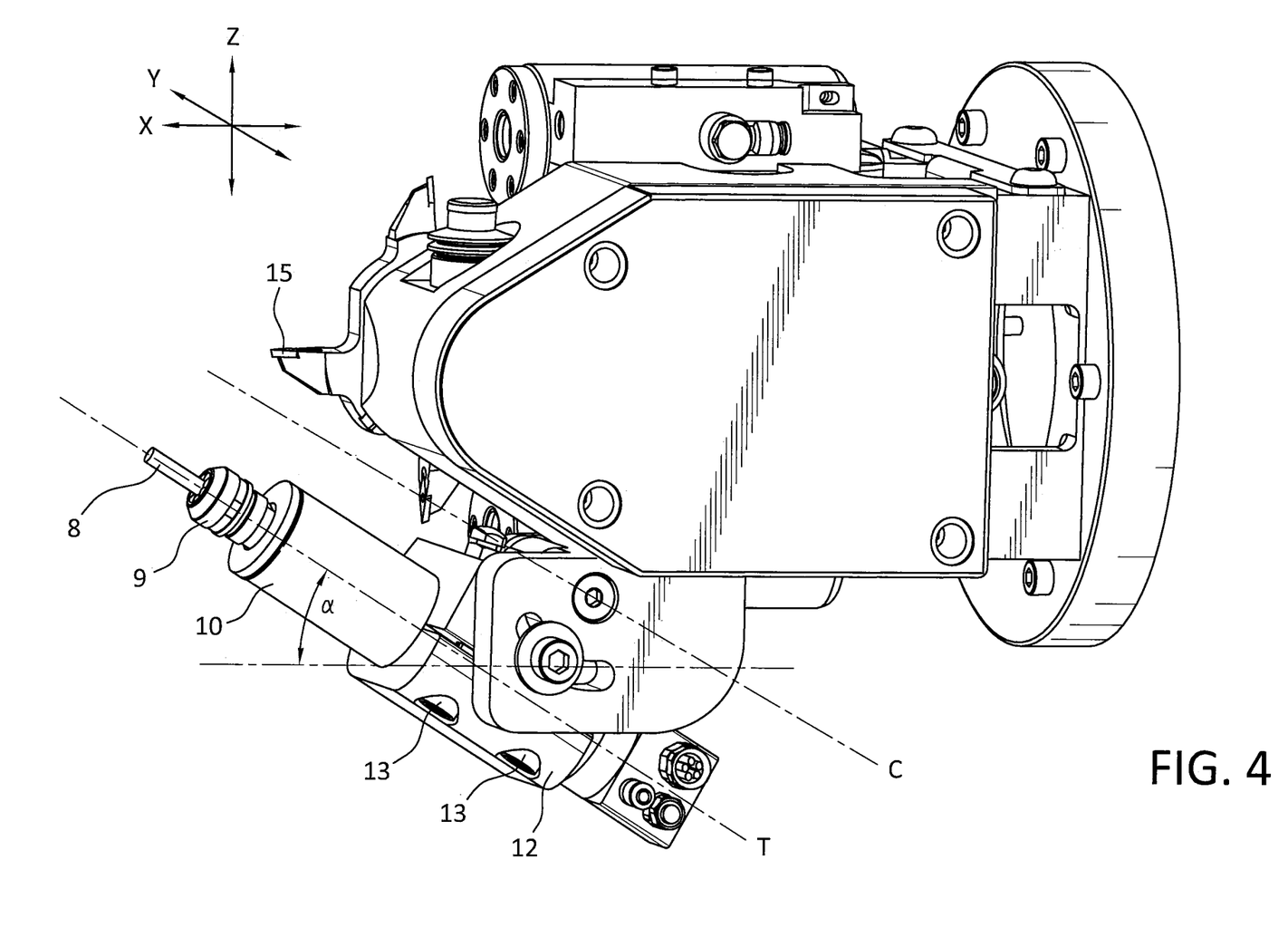
FIG. 4 shows a perspective view of a side of a chamfering head with one tool extended and oriented at an angle.
Figure 5:
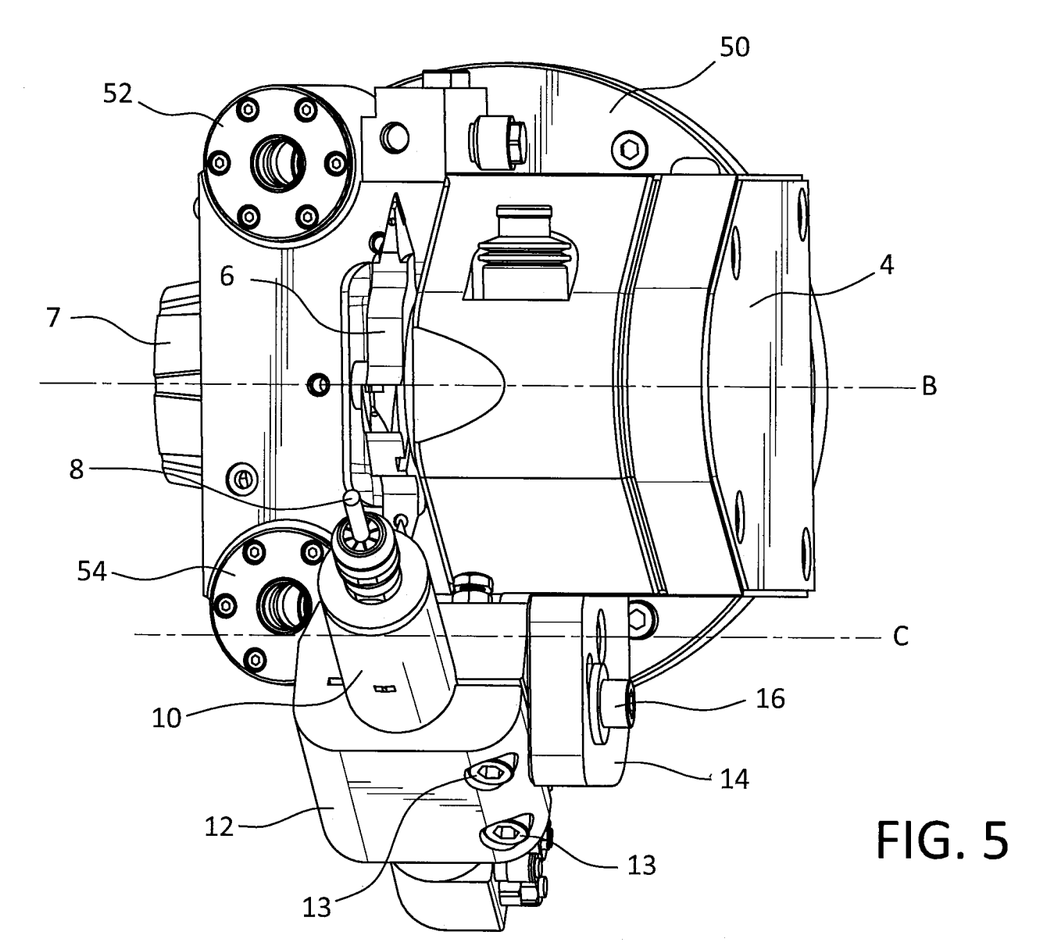
FIG. 5 shows a perspective view of the front of the chamfering head of FIG. 4 with one tool extended and oriented at an angle.
Figure 6:
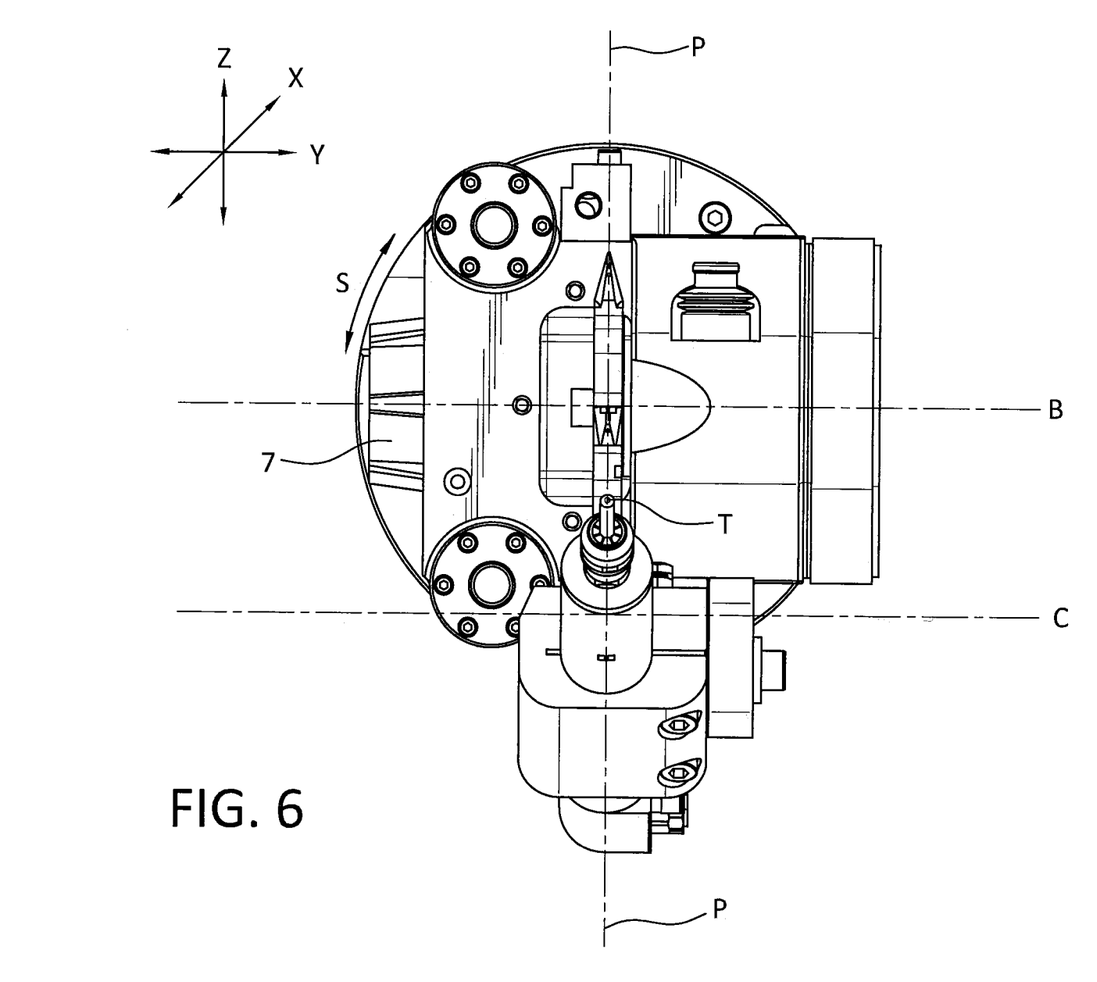
FIG. 6 shows a front elevation view of the chamfering head of FIG. 4 with one tool extended and oriented at an angle.

Tool 8 is preferably movable in the direction of tool axis T from a retracted position (FIG. 1) to an extended operational position as shown in FIGS. 4-6. The movement of tool 8 may be carried out by loosening screws 13 in motor clamp 12 and moving the motor 10 linearly until the intended operational position to tool 8 is reached and the screws 13 are then tightened. Linear movement of motor 10 and tool 8 may also be effected by hydraulic, pneumatic or electronic means, for example. Alternatively, the unclamping, moving and clamping of motor 10 and tool 8 may be automated and carried out via computer control. The amount of extension of tool 8 may be limited by a fixed stop mechanism or may be adjustable or programmable to any desired amount.

As mentioned above, FIGS. 4-6 illustrate an extended and pivoted position of the tool 8 which is shown as a pencil milling tool. In FIGS. 4-6, for example, the pivot angle α is 30 degrees with respect to a reference line representative of the axis T position of FIG. 1. The pivot angle may also be defined with respect to the A-axis, for example, or with respect to any other axis or reference position. The pivot angle may be fixed for a particular workpiece or may be adjusted from one workpiece to another such as for different gears on a shaft. It is also contemplated that the angular setting of tool 8 may be computer controlled and include the ability to change angular positions during the milling of a workpiece and coordinate angular positions with other chamfering device motions (e.g. motions along or about axes X, Y, Z, A and/or B).

Figure 7:
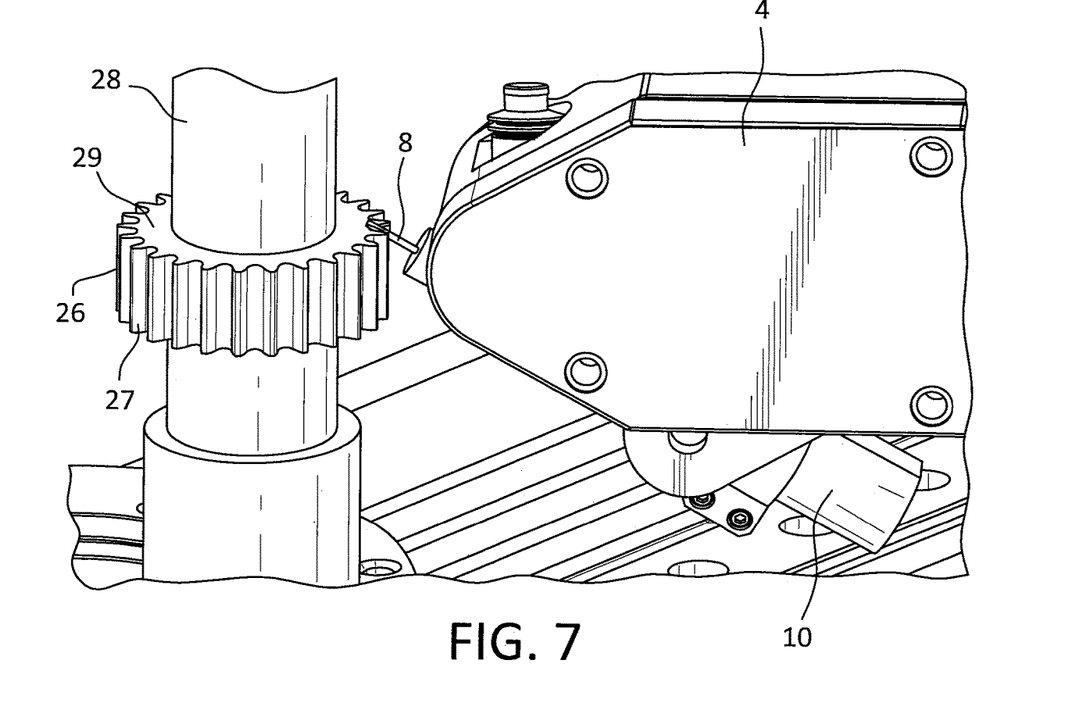
FIG. 7 shows a tool of the chamfering head machining a chamfer on a toothed workpiece.
Figure 8:
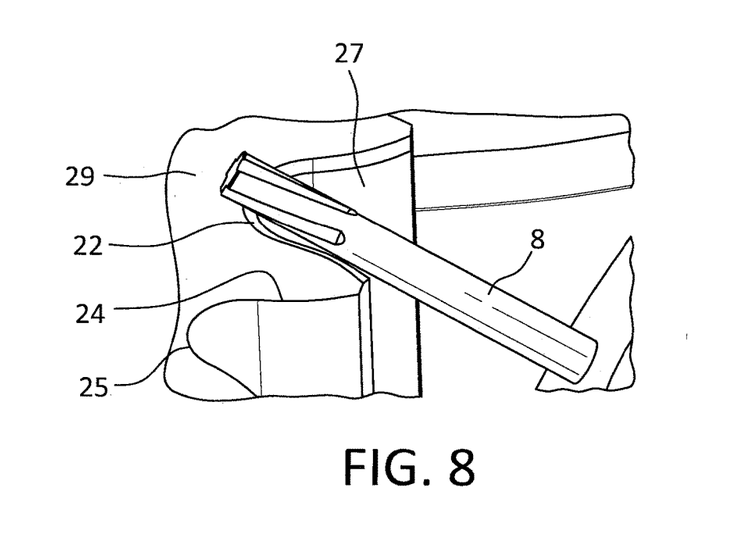
FIG. 8 is a close-up of the chamfering of FIG. 7.

FIGS. 7 and 8 are exemplary views showing a tooth edge 24 formed at the intersection of a tooth flank surface 27 and an end face 29 of spur gear 26 located on a shaft 28. A pencil mill 8 is moved along the tooth edge and forms a chamfer 22 along the tooth edge 24 and root portion 25 of the spur gear 26. While a pencil mill 8 is shown, any suitable type and size milling tool may be utilized.

Figure 13:
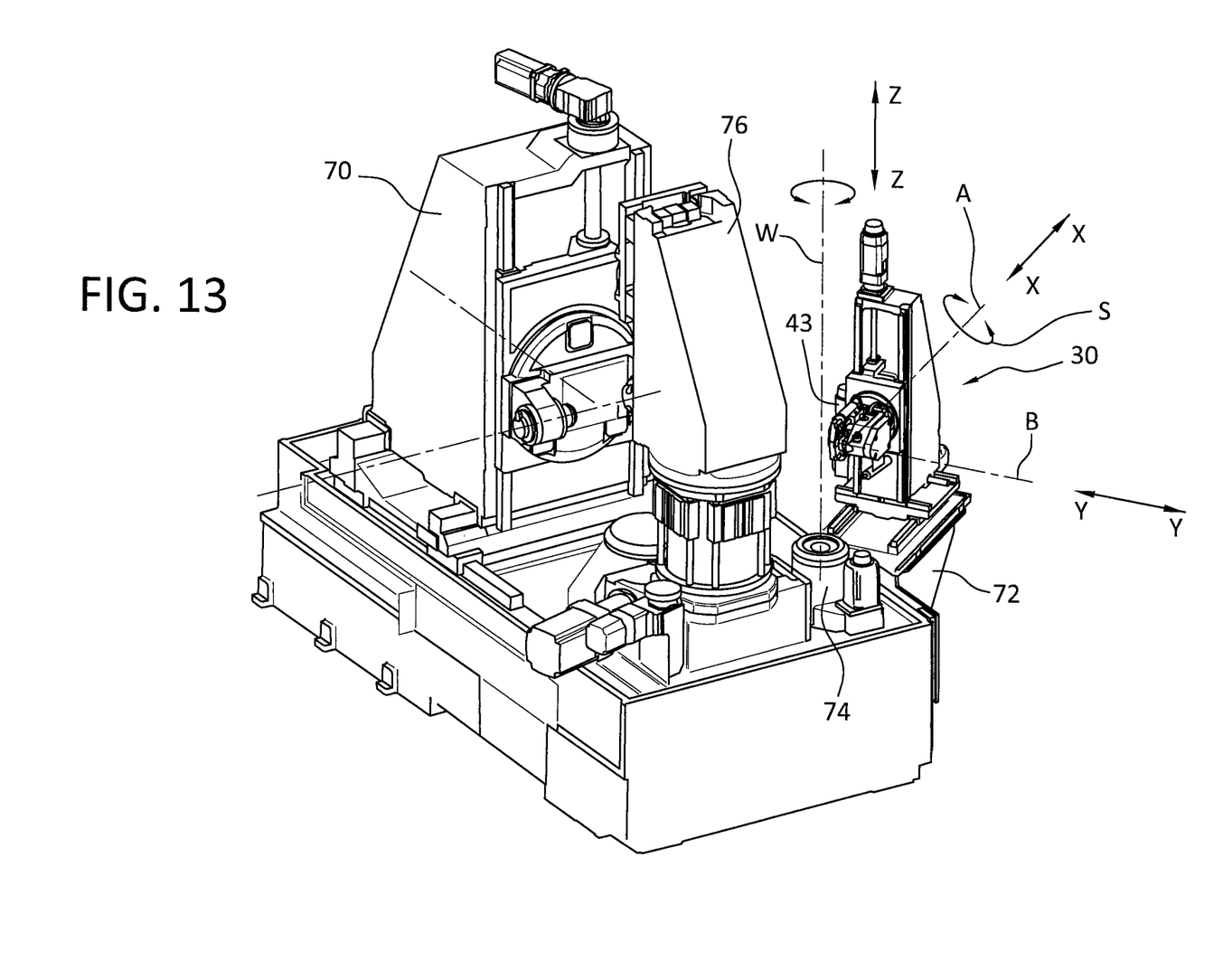
FIG. 13 shows a perspective view of the inventive chamfering device arranged in combination with a gear hobbing machine.

FIG. 9 shows a preferred embodiment of a chamfering device 30 of which the chamfering head 2 forms a part thereof. Chamfering device 30 further includes a base 32, table 34 and a column 36. Table 34 is movable in the X-direction via guide rails 38 and servo motor 40. Column 36 is positioned on table 34 and is movable in the Y-direction via guide rails 42 and a servo motor 43 (FIG. 13).

Column 36 includes a slide 44 movable in the Z-direction via guide rails 46 and servo motor 48. A rotary or swivel plate 50 is positioned on table 44 for swiveling in direction S about an axis A by a servo motor (not shown). Body portion 4 is positioned on swivel plate 50. Thus it can be seen that body portion 4 and hence, tools 6 and 8, are capable of being positioned linearly in the X, Y and/or Z directions as well as angularly in direction S by swiveling about the A-axis.

Movement of table 34 in direction X, column 36 in direction Y, slide 44 in direction Z, angular motion S of swivel plate 50 about axis A, as well as rotation of tool 6 about axis B, is imparted by separate respective drive motors (7, 40, 43 and 48 are shown). The above-named components are capable of independent movement with respect to one another or may move simultaneously with one another. Each of the drive motors is preferably associated with a feedback device such as a linear or rotary encoder as part of a CNC system which governs the operation of the drive motors in accordance with instructions input to a computer controller which may be a dedicated computer control (i.e. CNC) dedicated to the chamfering device 30 or the computer control (e.g. Siemens 840D series or Fanuc 30iB series, not shown) of an associated machine tool such as a gear hobbing machine.

Chamfering head 2 is movable along or about one or more of the axes X, Y, Z and/or A, and chamfering tools 6 and 8 may be swiveled (e.g. by 180 degrees) in direction S about the A-axis. By doing so, the two end faces of a workpiece can be accessed by the tools and the cutting direction of the chamfering tool 6 can be reversed at opposite ends of a tooth slot. While the direction of rotation of the drive of tool 6 remains the same in both swivel positions, the cutting directions of the tool are opposite to each other so that the tooth can be cut from inside to outside, or outside to inside, on the two end faces of the workpiece in both machining positions.

Figure 10:
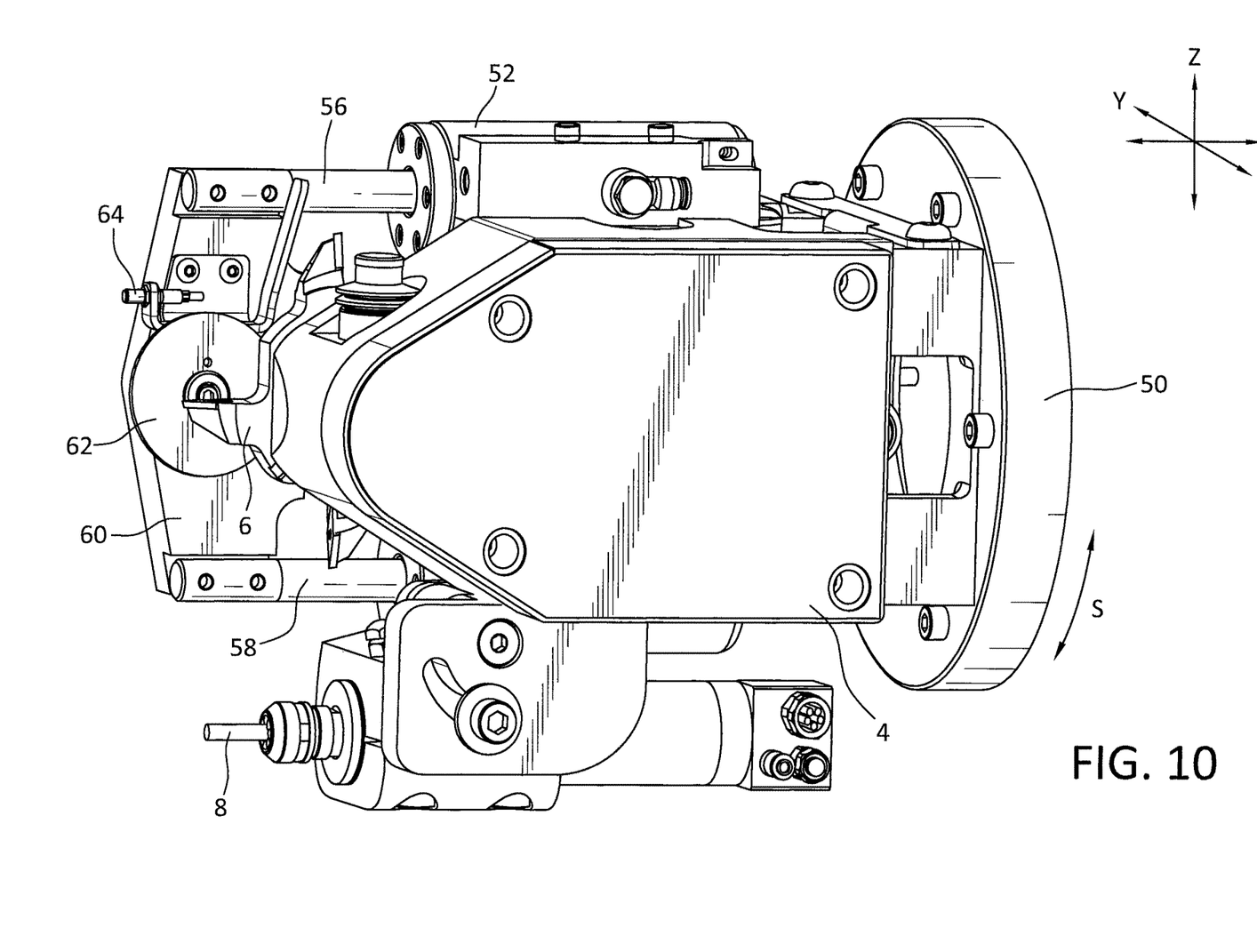
FIG. 10 is a perspective view of a side of a chamfering head with an extension/retraction means for additional tools in the extended position.
Figure 11:
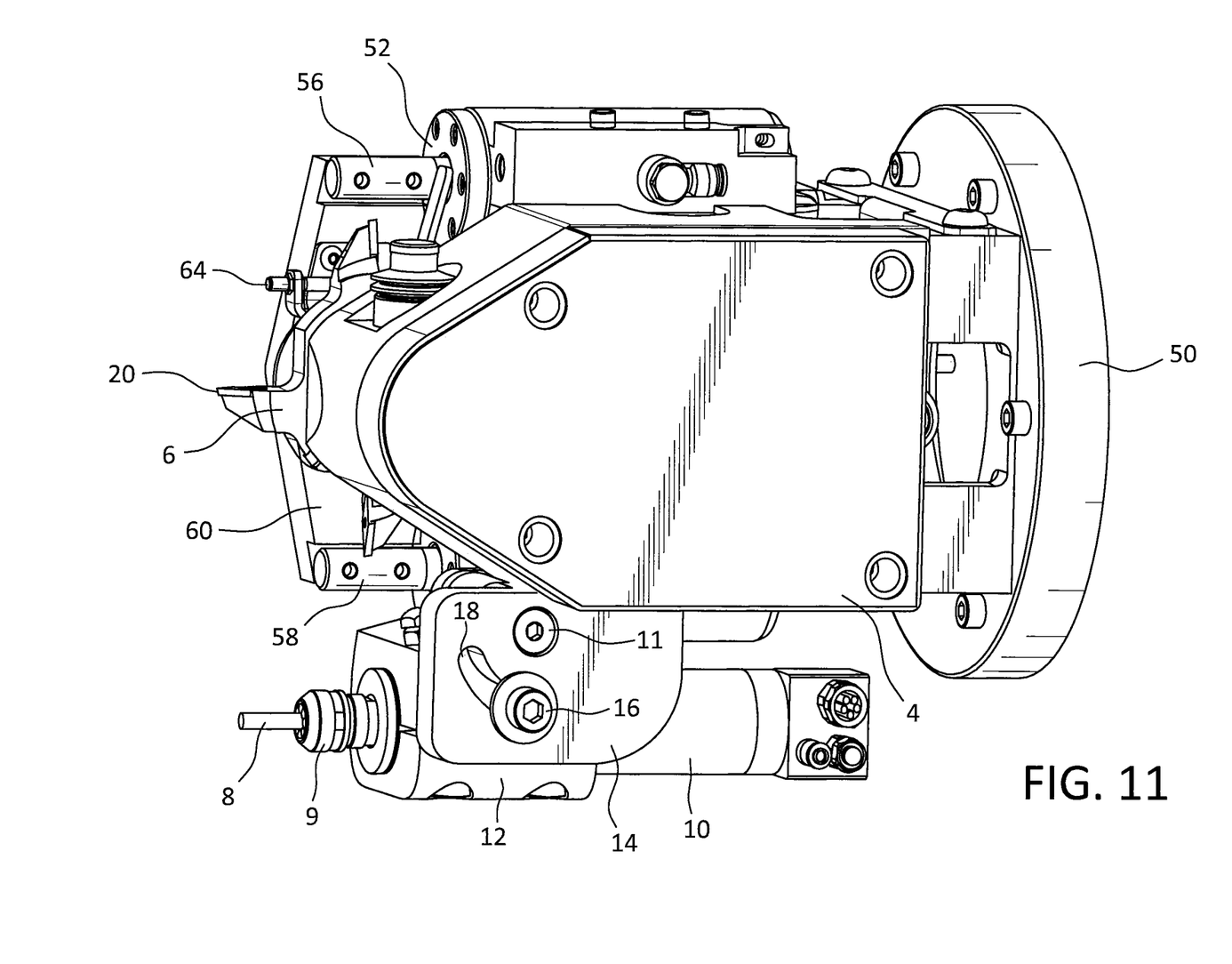
FIG. 11 is a perspective view of a side of a chamfering head with an extension/retraction means for additional tools in the retracted position.
Figure 12:
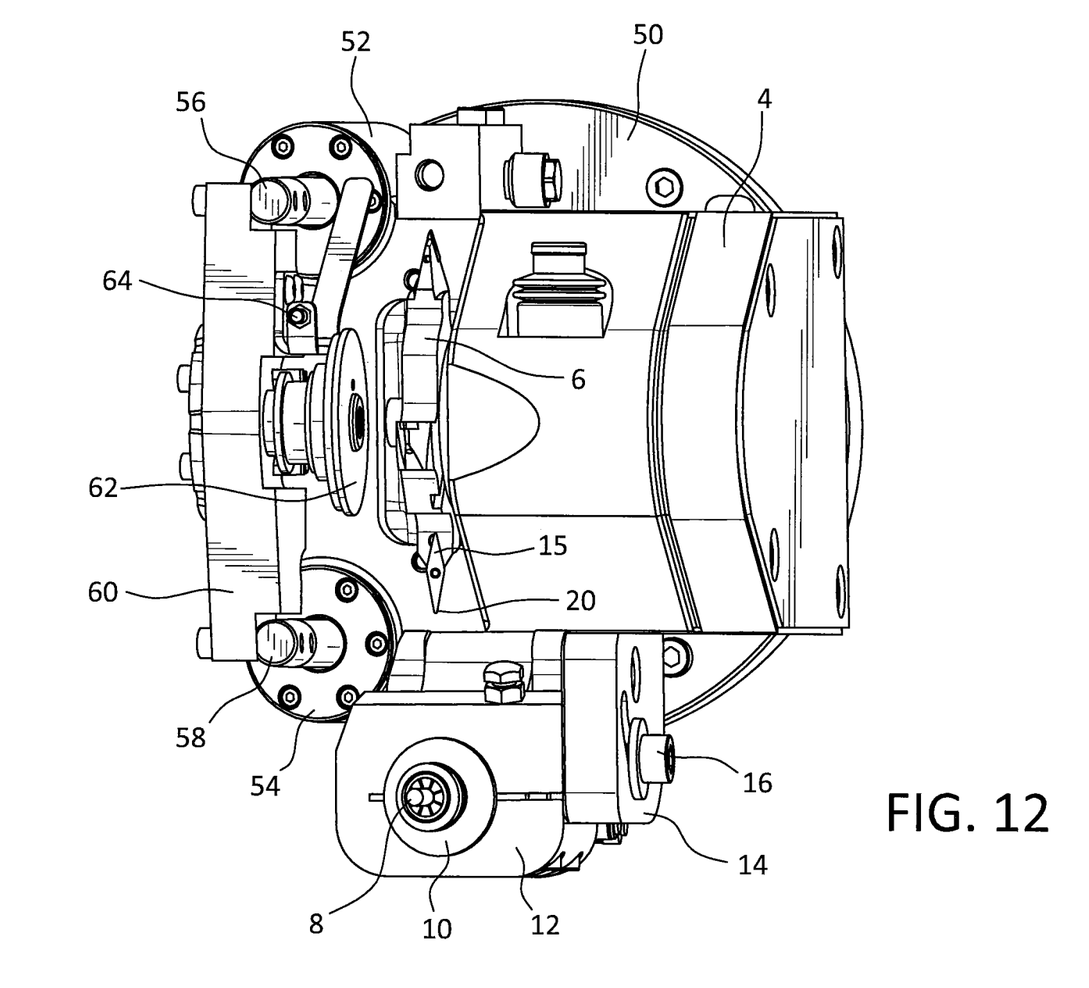
FIG. 12 is a perspective view of the front of a chamfering head with an extension/retraction means for additional tools in the extended position.

FIGS. 10-12 illustrate another embodiment of the invention wherein body portion 4 further includes an assembly comprising one or more actuating cylinders 52, 54, such as hydraulic or pneumatic cylinders, along with respective cylinder rods 56, 58 and a support surface 60, such as a plate, on which one or more additional tools are positionable. A deburring tool 62, preferably a disk-shaped deburring tool, and a non-contact type sensor 64 are shown and are removably attached to plate 60. The cylinders 52, 54 and rods 56, 58 enable movement of the deburring tool 62 and sensor 64 between a retracted position (FIG. 11) and an extended working position (FIGS. 10 and 12) which would be adjacent to a workpiece such as a gear.

Deburring tool 62 may function to remove burrs on the tooth edges of a workpiece resulting from a previous cutting process, such as hobbing, or as may result from a deburring process such as by tool 6 for example. Non-contact sensor 64 is utilized to determine the correct rotational position of a toothed workpiece whereby a rotary tool, such as tool 6, may engage the workpiece in a meshing manner so as to not collide with and damage the teeth of the workpiece. Such a process is known to the artisan as "centering", "indexing" or "stock-dividing". Alternatively, a contact-type sensor (e.g. touch or tactile probe) may be utilized instead of non-contact sensor 64.

While two cylinders and rods are shown, the invention is not limited thereto. A single cylinder and rod may be utilized for advancing and retracting a support surface such as a plate with one or more tools positioned thereon. Alternatively, other means of linear actuation may also be utilized. Furthermore, only one of a deburring tool and non-contact sensor may be included on plate 60. Other tools (e.g. camera, RFID chip reader, bar code reader, optical scanner, etc.) may be included on plate 60.

Chamfering device 30 may be included within another machine such as a gear hobbing machine or may be attached to another machine such as a gear hobbing machine. Chamfering device 30 may also be a stand-alone device. Workpieces may be transferred to and from chamfering device 30 via known transfer mechanism such as a robot, gantry loader, ring loader, carousel loader, etc. as will be understood by the skilled artisan.

FIG. 13 illustrates an example of a chamfering device 30 positioned adjacent to a gear hobbing machine 70 via a support table 72 attached to the hobbing machine. After hobbing, a workpiece is transferred to spindle 74 by a transfer mechanism 76 as mentioned above. A workpiece is held in spindle 74 by suitable workholding equipment (not shown) for rotation about axis W. Chamfering device 30 is moved in the X-direction so as to engage a workpiece with one or both of tools 6, 8 (FIG. 1) and/or one or more tools located on plate 60 (FIG. 10) such as deburring tool deburring tool 62 and sensor 64.

Although the invention has been discussed relative to gear hobbing machines, which generally produce spur and helical gears, the invention is not limited thereto. The inventive chamfering device may be utilized in conjunction with, and for gears produced by, bevel and hypoid gear cutting machines, gear gashing machines, gear shaping machines, power skiving machines, etc.

While tool 8 has been discussed as being pivotable and linear adjustable, the invention is not limited thereto. Tool 8 may be mounted in a fixed position relative to the body portion 4 or only one of pivoting and linear adjustability may be provided.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:
1. A toothed workpiece chamfering device, said chamfering device comprising:
    a chamfering head comprising a first tool axis of rotation and a second tool axis of rotation,
    said chamfering head being operable to rotate a first chamfering tool about said first axis of rotation thereby enabling chamfering by a first material removal method,
    said chamfering head being further operable to rotate a second chamfering tool about said second axis of rotation thereby enabling chamfering by a second material removal method,
    wherein said first chamfering tool and said second chamfering tool are different from one another and wherein said first material removal method and said second material removal method are different from one another,
    wherein said second tool axis of rotation is angularly movable about a pivot axis,
    wherein angular movement of said second axis of rotation comprises movement of the second axis in a tool axis plane, said tool axis plane being perpendicular to said first tool axis of rotation,
    wherein said first chamfering tool comprises a cutting tool with said cutting tool comprising one or more cutting tips wherein the one or more cutting tips define a cutting circle when said cutting tool is rotated about said first axis of rotation, wherein said cutting circle lies in said tool axis plane.

2. The device of claim 1 said first tool axis and said second tool axis are perpendicular to one another.

3. The device of claim 1 wherein said pivot axis is parallel to said first tool axis of rotation.

4. The device of claim 1 wherein said second chamfering tool comprises a cutting tool, said cutting tool of said second chamfering tool being movable along said second tool axis between an extended operational position and a retracted non-operational position.

5. The device of claim 1 wherein said cutting tool comprises a fly cutter having one or more indexable inserts.

6. The device of claim 1 wherein said second chamfering tool comprises a cutting tool.

7. The device of claim 6 wherein said cutting tool of said second chamfering tool comprises a milling tool.

8. The device of claim 7 wherein said milling tool comprises a pencil mill.

9. The device of claim 1 further comprising a deburring tool.

10. The device of claim 1 further comprising a non-contact sensor or a contact-type sensor operated to determine the correct rotational position of a toothed workpiece whereby a rotary tool may engage the workpiece in a meshing manner so as to not collide with and damage the teeth of the workpiece.

11. The device of claim 1 further comprising a support surface capable of supporting one or more additional tools, said support surface being movable-between a retracted non-working position and an extended working position.

12. The device of claim 11 wherein said support surface is moved between said retracted non-working position and said extended working position via a system comprising one or more rods and cylinders.

13. The device of claim 1 wherein said chamfering head is movable linearly in three mutually perpendicular directions and is pivotable about a pivot axis.

14. A gear hobbing machine comprising the chamfering device of claim 1.

* * * * *